(12) United States Patent
Shih

(10) Patent No.: US 8,250,337 B2
(45) Date of Patent: Aug. 21, 2012

(54) ARRAY PROCESSOR WITH TWO PARALLEL PROCESSING PATHS OF MULTIPLIERS AND ALUS WITH IDLE OPERATION CAPABILITY CONTROLLED BY PORTIONS OF OPCODE INCLUDING INDICATION OF VALID OUTPUT

(75) Inventor: Garret Webster Shih, Brookline, MA (US)

(73) Assignee: Qualcomm Incorporated, San Diego, CA (US)

( * ) Notice: Subject to any disclaimer, the term of this patent is extended or adjusted under 35 U.S.C. 154(b) by 91 days.

(21) Appl. No.: 11/741,382

(22) Filed: Apr. 27, 2007

(65) Prior Publication Data

US 2008/0109635 A1    May 8, 2008

Related U.S. Application Data

(60) Provisional application No. 60/795,981, filed on Apr. 28, 2006.

(51) Int. Cl.
*G06F 17/16* (2006.01)
(52) U.S. Cl. .......................................... 712/11; 712/221
(58) Field of Classification Search .................. None
See application file for complete search history.

(56) References Cited

U.S. PATENT DOCUMENTS

| 4,996,661 | A | * | 2/1991 | Cox et al. .................. 708/508 |
| 5,117,499 | A | * | 5/1992 | Miyata ........................ 712/26 |
| 5,125,094 | A | * | 6/1992 | Kyuma ...................... 712/221 |
| 5,633,897 | A | * | 5/1997 | Fettweis et al. ............ 375/341 |
| 6,029,267 | A | * | 2/2000 | Simanapalli et al. ....... 714/795 |
| 6,421,698 | B1 | * | 7/2002 | Hong .......................... 708/490 |
| 7,463,628 | B2 | * | 12/2008 | Parker et al. ............... 370/392 |
| 2003/0009502 | A1 | * | 1/2003 | Katayanagi ............... 708/622 |
| 2003/0055861 | A1 | | 3/2003 | Lai et al. |
| 2005/0144215 | A1 | * | 6/2005 | Simkins et al. ............ 708/620 |
| 2006/0224656 | A1 | * | 10/2006 | Pechanek et al. .......... 708/622 |

FOREIGN PATENT DOCUMENTS

| JP | 447454 | 2/1992 |
| JP | 5346935 | 12/1993 |
| JP | 9185602 | 7/1997 |
| JP | 200192808 | 4/2001 |
| JP | 2002269067 | 9/2002 |
| JP | 200316051 | 1/2003 |

(Continued)

OTHER PUBLICATIONS

Price, C., MIPS, "MIPS IV Floating Point Instruction Set: Revision 3.2" (Online) Sep. 1, 1995, Retrieved from the Internet: URL:http://math-atlas.sourceforge.net/devel/assembly/mips-iv.pdf (retrieved on Sep. 4, 2007), pp. B65, B76-B79.

(Continued)

*Primary Examiner* — Kenneth Kim
(74) *Attorney, Agent, or Firm* — Qualcomm Patent Group; James Hunt Yancey, Jr.

(57) ABSTRACT

General purpose array processing techniques including processing methods and apparatus. Processors may include parallel processing paths designed with reusable computational components such as multipliers, multiplexers, and ALUs. Flow of data through the paths and operations performed may be controlled based on opcodes. Processors may be shared, scalable, and configured to perform matrix operations. In particular, such operation may be useful for physical sections of MIMO-OFDM communication systems.

50 Claims, 4 Drawing Sheets

FOREIGN PATENT DOCUMENTS

JP        2003346139      12/2003

OTHER PUBLICATIONS

Rogenmoser, R., et al., "A Dual-Issue Floating-Point Coprocessor with SIMD Architecture and Fact 3D Functions" Solid-State Circuits Conference, 2002. Digest of Technical Papers. 2002 IEEE International Feb. 3-7, 2002, Piscataway, NJ, USA, IEEE, vol. 1, 2002, pp. 414-415 and figure 25.3.1, ISBN: 0-7803-7335-9.

International Search Report—PCT/US07/067721, International Search Authority—European Patent Office—Oct. 2, 2007.

Written Opinion—PCT/US2007/067721—ISA/EPO—Oct. 2, 2007.

Office Action dated Jun. 15, 2010 for Japanese Application No. 2009-508002.

Office Action dated May 10, 2011 for J Japanese Application No. 2009-508002.

\* cited by examiner

ARRAY PROCESSOR WITH TWO PARALLEL PROCESSING PATHS OF MULTIPLIERS AND ALUS WITH IDLE OPERATION CAPABILITY CONTROLLED BY PORTIONS OF OPCODE INCLUDING INDICATION OF VALID OUTPUT

CLAIM OF PRIORITY UNDER 35 U.S.C. §119

The present Application for Patent claims priority to Provisional Application No. 60/795,981 entitled "General Purpose Array Processor" filed Apr. 28, 2006, assigned to the assignee hereof and hereby expressly incorporated by reference herein.

BACKGROUND

1. Field

The instant disclosure relates generally to array processing and more particularly to general purpose array processing techniques.

2. Background

In communication systems, as well as a wide range of other systems, a large number of matrix operations may be performed to process data. For example, a variety of complex matrix-related algorithms may be used in communication systems to code/decode transmitted signals and/or to divide data among or reconstruct data from a plurality of communication channels (i.e., multiplex/demultiplex). Such algorithms may perform a variety of matrix-related algorithms such as Fourier transforms that may be implemented with a large number of matrix arithmetic operations in a particular sequence.

Communication systems in particular may perform a large number of matrix operations in a physical layer of operation. The physical layer of a communication system may provide functionality related to channelization and coding of data as well as interfacing with high level data layers such as data link layers. Because of the modern use of orthogonality in some communication technologies such as Orthogonal Frequency Division Multiplexing (OFDM), the number of matrix-related operations performed during the receipt and transmission of data may be large. Moreover, the use of multiple-input multiple-output (MIMO) technology further increases reliance on matrix operations in communication systems.

Traditional communication systems may be designed from a component level to perform various algorithms through specialized circuitry. For example, physical layers of a communication system may be designed with a set of specialized components that each performs a particular algorithm along a data path of a physical layer. Each algorithm may be hardwired into specialized circuitry, such as Fourier transform circuitry, or other arithmetic and/or logic circuitry.

Legacy support of older Institute of Electrical and Electronics Engineers (IEEE) standards, and increasing complexity of communication systems has strained resources related to the development of specialized circuitry to perform all of the potential matrix related algorithms that a communication system may be expected to perform. Specifically, budget, space, and power usage resources have been strained in applications designed using traditional design techniques.

SUMMARY

Techniques for general purpose array processing are disclosed herein. In one aspect of the instant disclosure it is recognized that a general purpose array processor may ease strained resources of system designs. Such general purpose array processors may be configured to perform a plurality of matrix-related operations that may be used in a plurality of matrix-related algorithms and/or by a plurality of higher level processing elements. In some embodiments, the plurality of matrix-related operation may include arithmetic operations performed on components of a matrix.

Some embodiments of a general purpose array processor may be used in a physical layer of a communication system. In some embodiments, the general purpose array processor may provide the functionality to satisfy a plurality of commonly used operations used by owner resources using basic hardware components such as multipliers, ALUs, multiplexers, and registers. In some embodiments, the owner resources may perform, for example, fast Fourier transforms, spatial processing, minimum mean square error determination, channel determination, weight computation, and/or phase correction. In some embodiments, the general purpose array processor may be configured to be configured to perform portions of any algorithm involving real and/or complex matrix multiplications.

One aspect of the instant disclosure includes an array processor apparatus. In some embodiments, the array processor apparatus comprises a plurality of multiplexers, a plurality of multipliers, a plurality of arithmetic logic units (ALUs), and at least one opcode control element. In some embodiments, the plurality of multiplexers, the plurality of multipliers, and the plurality of ALUs are constructed and arranged to form two parallel processing paths, each parallel processing path being configured to perform a set of matrix operations according to an opcode received by the opcode control element.

In some embodiments, the opcode includes at least one of an idle opcode and a multiply operation opcode. In some embodiments, the multiply operation opcode includes an indication of at least one of a multiply operation, a multiply operation with external addition, a multiply operation with external subtraction, a multiply operation with accumulation, a multiply operation with summation of results, a multiply operation with subtraction of results, a multiply operation with summation of results and external addition, a multiply with summation of results and external subtract, a multiply operation with subtraction of results and external addition, a multiply operation with subtraction of results and external addition, a multiply operation with summation of results and accumulation, and a multiply operation with subtraction of results and accumulation.

In some embodiments, the two parallel processing paths are configured to perform each of the multiply operation, the multiply operation with external addition, the multiply operation with external subtraction, the multiply operation with accumulation, the multiply operation with summation of results, the multiply operation with subtraction of results, the multiply operation with summation of results and external addition, the multiply with summation of results and external subtract, the multiply operation with subtraction of results and external addition, the multiply operation with subtraction of results and external addition, the multiply operation with summation of results and accumulation, and the multiply operation with subtraction of results and accumulation.

In some embodiments, a first parallel processing path of the two parallel processing paths includes a first pipelined parallel processing path, and a second parallel processing path of the two parallel processing paths includes a second pipelined parallel processing path. In some embodiments, input to a first pipeline stage of the first parallel processing path may include output of a second pipeline stage of the second parallel processing path. In some embodiments, the opcode control element is configured to select the input to the first pipeline stage and the input to the second pipeline stage based on the opcode. In some embodiments, input to a third pipeline stage of the second parallel processing path may include output of a fourth pipeline stage of the first parallel processing path.

In some embodiments, the first pipeline stage includes a multiplication stage and the second pipeline stage includes an arithmetic-logic stage. In some embodiments, the first pipeline stage includes an arithmetic-logic stage and the second pipeline stage includes a multiplication stage. In some embodiments, the first pipeline stage includes a first arithmetic-logic stage and the second pipeline stage includes a second arithmetic-logic stage. In some embodiments, a first parallel processing path of the two parallel processing paths includes a processing path for processing real matrix values, and a second parallel processing path of the two parallel processing paths includes a processing path for processing imaginary matrix values.

In some embodiments, the plurality of multipliers includes two multipliers. In some embodiments, a first parallel processing path of the two parallel processing paths includes a first multiplier of the two multipliers, and a second parallel processing path of the two parallel processing paths includes a second multiplier of the two multipliers. In some embodiments, the plurality of ALUs includes two ALUs. In some embodiments, a first parallel processing path of the two parallel processing paths includes a first ALU of the two ALUs, and a second parallel processing path of the two parallel processing paths includes a second ALU of the two ALUs. In some embodiments, a first input of the first ALU includes an output of a first multiplier of the plurality of multipliers, a second input of the first ALU includes an output of a second multiplier of the plurality of multipliers, and an input of the second ALU includes an output of the second multiplier.

In some embodiments, the opcode controller is configured to select an arithmetic operation performed by at least one of the plurality of ALUs based on the opcode. In some embodiments, the opcode controller is configured to control a flow of data through the plurality of multiplexers based on the opcode. In some embodiments, controlling the flow of data includes controlling data dependencies between the two parallel processing paths and input of external data. In some embodiments, a MIMO OFDM receiver apparatus comprises at least one array processor apparatus. In some embodiments, the MIMO OFDM receiver apparatus comprises a plurality of array processor apparatus. In some embodiments, a MIMO OFDM transmitter apparatus comprises at least one array processor apparatus. In some embodiments, the MIMO OFDM transmitter apparatus comprises a plurality of array processor apparatus.

One aspect of the instant disclosure includes an array processor apparatus. In some embodiments, the array processor apparatus includes a means for controlling a path of data through two parallel processing paths based on an opcode, a means for performing two parallel matrix operations on data in each of the two parallel processing paths, and a means for selecting the two parallel matrix operations based on the opcode.

In some embodiments the opcode includes at least one of an idle opcode and a multiply operation opcode. In some embodiments, the multiply operation opcode includes an indication of at least one of a multiply operation, a multiply operation with external addition, a multiply operation with external subtraction, a multiply operation with accumulation, a multiply operation with summation of results, a multiply operation with subtraction of results, a multiply operation with summation of results and external addition, a multiply with summation of results and external subtract, a multiply operation with subtraction of results and external addition, a multiply operation with subtraction of results and external addition, a multiply operation with summation of results and accumulation, and a multiply operation with subtraction of results and accumulation.

In some embodiments, the means for performing two parallel matrix operations includes means for performing each of the multiply operation, the multiply operation with external addition, the multiply operation with external subtraction, the multiply operation with accumulation, the multiply operation with summation of results, the multiply operation with subtraction of results, the multiply operation with summation of results and external addition, the multiply with summation of results and external subtract, the multiply operation with subtraction of results and external addition, the multiply operation with subtraction of results and external addition, the multiply operation with summation of results and accumulation, and the multiply operation with subtraction of results and accumulation.

In some embodiments, the means for controlling the path of data comprises a means for controlling dependency of data between the two parallel processing paths, and a means for controlling input of external data to the two parallel processing paths. In some embodiments, the means for performing two parallel matrix operations comprises a means for processing real matrix values, and a means for processing imaginary matrix values in parallel with the real matrix values. In some embodiments, the means for controlling the path of data based on the opcode comprises a means for selecting an output of a plurality of multiplexers. In some embodiments, the means for selecting the two parallel matrix operations based on the opcode comprises a means for selecting an arithmetic operation performed by at least one ALU.

One aspect of the instant disclosure includes a method of performing matrix operations. In some embodiments, the method comprises controlling a flow of data through two parallel processing paths based on an opcode, performing a first matrix operation in a first parallel processing path of the two parallel processing paths based on the opcode, and performing a second matrix operation in a second parallel processing path of the two parallel processing paths based on the opcode.

In some embodiments, the opcode includes at least one of an idle opcode and a multiply operation opcode. In some embodiments, the multiply operation opcode includes an indication of at least one of a multiply operation, a multiply operation with external addition, a multiply operation with external subtraction, a multiply operation with accumulation, a multiply operation with summation of results, a multiply operation with a subtraction of results, a multiply operation with summation of results and external addition, a multiply with summation of results and external subtract, a multiply operation with subtraction of results and external addition, a multiply operation with subtraction of results and external addition, a multiply operation with summation of results and accumulation, and a multiply operation with subtraction of results and accumulation.

In some embodiments, controlling the flow of data through the two parallel processing paths includes directing an output of a first pipeline stage of a first parallel processing path of the two parallel processing paths to an input of a second pipeline stage of a second parallel processing path of the two parallel processing paths. In some embodiments, controlling the flow of data through the two parallel processing paths includes selecting an input to the first pipeline stage of the first parallel processing path and the second pipeline stage of the second parallel processing path based on the opcode.

In some embodiments, the first pipeline stage includes a multiplication stage and the second pipeline stage includes an arithmetic-logic stage. In some embodiments, the first pipeline stage includes an arithmetic-logic stage and the second pipeline stage includes a multiplication stage. In some embodiments, the first pipeline stage includes a first arithmetic-logic stage and the second pipeline stage includes a second arithmetic-logic stage. In some embodiments, controlling the flow of data through the two parallel processing paths includes directing an output of a third pipeline stage of the second parallel processing path to an input of a fourth pipeline stage of the first parallel processing path.

In some embodiments, performing the first matrix operation in the first parallel processing path of the two parallel processing paths based on the opcode comprises processing real matrix values, and performing the second matrix operation in the second parallel processing path of the two parallel processing paths based on the opcode comprises processing imaginary matrix values. In some embodiments, controlling the flow of data through two parallel processing paths based on the opcode includes controlling a plurality of multiplexers based on the opcode.

In some embodiments, controlling the flow of data through the two parallel processing paths includes controlling data dependencies between the two parallel processing paths and controlling input of external data. In some embodiments, controlling the flow of data through the two parallel processing paths includes directing an output of a first multiplier of a first parallel processing path of the two parallel processing paths and directing the output of a second multiplier of a second parallel processing path of the two parallel processing paths. In some embodiments, directing the output of the first multiplier compromises directing the output of the first multiplier to a first input of a first ALU of the first parallel processing path and directing the output of the second multiplier comprises directing the output of the second multiplier to a second input of the first ALU and an input of a second ALU of the second parallel processing path.

In some embodiments, performing the first matrix operation in the first parallel processing path of the two parallel processing paths based on the opcode includes selecting a first operation for a first ALU based on the opcode, and performing the second matrix operation in the second parallel processing path of the two parallel processing paths based on the opcode includes selecting a second operation for a second ALU based on the opcode.

One aspect of the instant disclosure includes a machine-readable medium including instruction stored thereon. In some embodiments, the instruction comprise a first instruction set for selecting data dependency in respective multiply stages of two parallel processing paths for performing parallel matrix operation based on an opcode, and a second instruction set for selecting respective arithmetic-logic operations and data dependencies in respective arithmetic-logic stages of the two parallel processing paths based on the opcode.

In some embodiments, the opcode includes at least one of an idle opcode and a multiply operation opcode. In some embodiments, the multiply operation opcode includes an indication of at least one of a multiply operation, a multiply operation with external addition, a multiply operation with external subtraction, a multiply operation with accumulation, a multiply operation with summation of results, a multiply operation with a subtraction of results, a multiply operation with summation of results and external addition, a multiply with summation of results and external subtract, a multiply operation with subtraction of results and external addition, a multiply operation with subtraction of results and external addition, a multiply operation with summation of results and accumulation, and a multiply operation with subtraction of results and accumulation.

BRIEF DESCRIPTION OF THE DRAWINGS

The accompanying drawings are not intended to be drawn to scale. In the drawings, each identical or nearly identical component that is shown in various figures is represented by a like numeral. For purposes of clarity, not every component may be labeled in every drawing. In the drawings.

DETAILED DESCRIPTION

Figure 1:
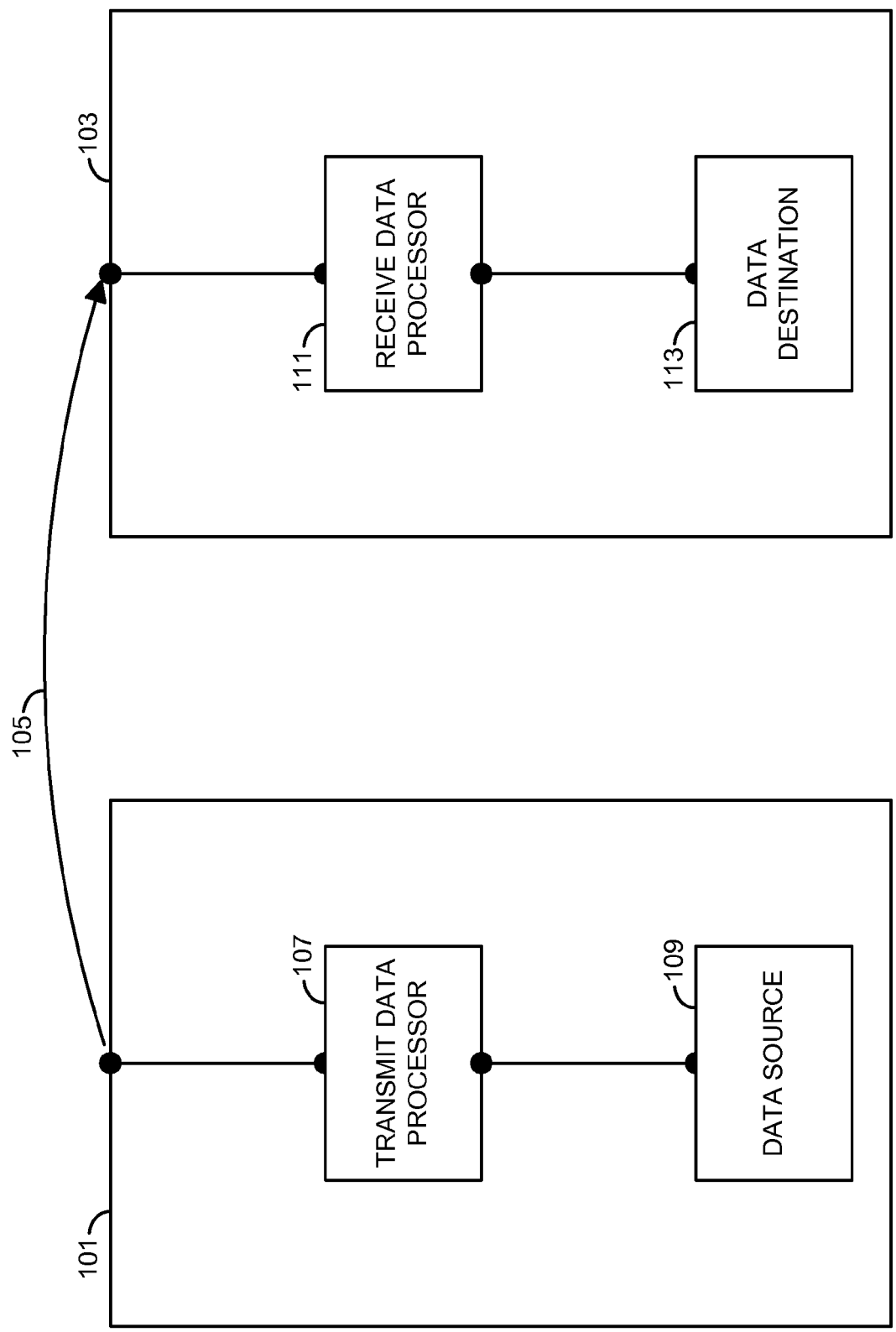
FIG. 1 illustrates a block diagram of two communication stations in accordance with some embodiments of the instant disclosure.

Embodiments of the instant disclosure are not limited in their application to the details of construction and the arrangement of components and acts set forth in the following description or illustrated in the drawings. The instant disclosure is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, are meant to encompass the items listed thereafter and equivalents thereof as well as additional items. The word "exemplary" and variations thereof used herein are to mean "serving as an example, instance, or illustration." Any embodiment or design described herein as "exemplary" is not necessarily to be construed as preferred or advantageous over other embodiments or designs.

The general purpose array processing techniques described herein may be used for various communication systems such as wireless wide area networks (WWANs), wireless metropolitan area networks (WMANs), wireless local area networks (WLANs), such as one implementing IEEE 802.11a, 802.11g and/or 802.11n, and so on. The terms "network" and "system" may be used interchangeably herein. The general purpose array processing techniques described herein may also be used with various multiple access schemes such as Frequency Division Multiple Access (FDMA), Code Division Multiple Access (CDMA), Time Division Multiple Access (TDMA), Spatial Division Multiple Access (SDMA), Orthogonal FDMA (OFDMA), Single-Carrier FDMA (SC-FDMA), Orthogonal Frequency Division Multiplexing (OFDM), and so on. An OFDMA network utilizes Orthogonal Frequency Division Multiplexing (OFDM). An SC-FDMA network utilizes Single-Carrier Frequency Division Multiplexing (SC-FDM). OFDM and SC-FDM partition the system bandwidth into multiple (K) orthogonal subcarriers, which may be referred to as tones, and/or bins. Each subcarrier may be modulated with data. In general, modulation symbols may be sent in the frequency domain with OFDM and in the time domain with SC-FDM.

FIG. 1 shows a block diagram of an embodiment of two stations 101 and 103 in a wireless communication network 105. In FIG. 1, station 101 is acting as a transmitter of data and station 103 is acting as a receiver of data. It should be understood that in some embodiments, a single station may act as both a transmitter and a receiver of data.

Stations 101 and 103 may each be part of and/or may contain some or all of the functionality of an access point, a base station, a node, a terminal, a mobile station, user equipment, a subscriber unit, and/or some other device or other network entity.

Station 101 in the illustrated embodiment of FIG. 1 may be equipped with multiple antennas. Station 103 in the illustrated embodiment of FIG. 1 may also be equipped with multiple antennas. A communication network in which a receiver station and a transmitter station each have multiple inputs/outputs (e.g., antennas) may be referred to as a multiple-input multiple-output (MIMO) network. The IEEE 802.11n developing standard describes communication protocols that may be used in some implementations of a MIMO network. Each transmit antenna and each receive antenna may be a physical antenna or an antenna array. It should be understood that other embodiments of station 101 and/or station 103 may include a single antenna rather than multiple antennas.

At transmitter station 101, a transmit data processor 107 may receive data from a data source 109, and process the data to output through communication network 105. The data may include a data symbol and/or a pilot symbol. The data symbols and pilot symbols may be modulation symbols from a modulation scheme such as phase-shift keying (PSK) or quadrature amplitude modulation (QAM). In some implementations, transmit data processor 107 may multiplex the coded data signal for transmission in multiple streams through multiple output antennas.

In some embodiments, the data signal may be received by receiver station 103 (e.g., by multiple receive antennas). At receiver station 103, a receive data processor 111 may receive the data signal from the receive antennas, and process the data for use by data destination 113.

Some of the processing performed by receive data processor 111 and/or transmit data processor 107 may include physical layer processing. Physical layer processing may include processing raw bits of data for transmission and/or after receipt. Physical layer processing may include acts normally associated with the lowest layer of the well-known Open systems Interconnection (OSI) model of communication. In wireless communications systems, physical layer processing may include determining a combined bit stream from a plurality of bit streams of potentially questionable reliability and/or dividing a bit stream into a plurality of bit streams. Such processing may include a plurality of matrix operations, as is known in the art. After the physical layer processing is performed, information (e.g., a processed bit stream) may be provided to a higher communication layer (e.g., a data link layer, which may include a MAC sub-layer) and/or transmitted to a remote location. In some implementations, processing performed by one or both of receive data processor 111 and transmit data processor 107 may include higher level processing. In other applications, such higher layer processing may be performed, for example, by data source 109 and/or data destination 113.

Figure 2:
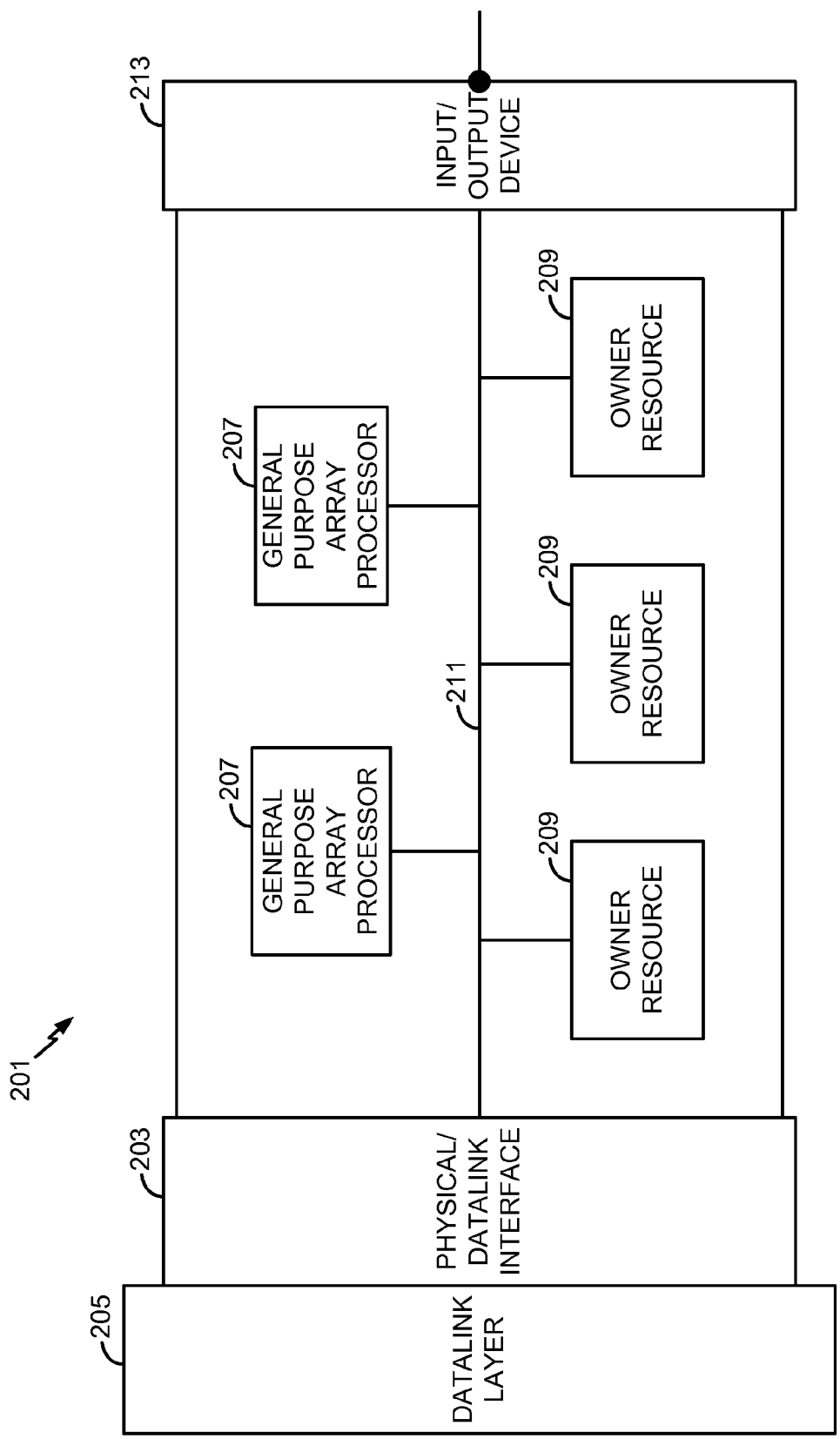
FIG. 2 illustrates an exemplary physical section of a data processor in accordance with some embodiments of the instant disclosure.

FIG. 2 illustrates an exemplary physical section 201 of a data processor that may be used in either transmit data processor 107 or receive data processor 111 to perform physical layer processing. As illustrated, physical section 201 may include a physical/data link interface 203 that allows data processed by physical section 201 to be output to a data link section 205 for data link layer processing and/or data to be received from data link layer 205 for physical layer processing by physical section 201 before transmission.

Physical section 201 may be coupled to an input and/or output device 213 through which information may be received and/or transmitted to/from a remote communication system. In some embodiments, input and/or output device 213 may include antennas of receiver and/or transmitter stations 101, 103.

Physical section 201 may include a plurality of general purpose array processors 207 and owner resources 209. Plurality of general purpose array processors 207 and owner resources 209 may be coupled by a communication network 211 (e.g., a system bus). Plurality of general purpose array processors 207 and owner resources 209 may perform operations related to physical layer processing. In some embodiments of the instant disclosure, owner resources 209 may include control elements configured to perform one or more physical layer process that may include one or more matrix related operations. In some embodiments, owner resources 209 may perform physical layer processing algorithms using general purpose array processors 207 to perform at least a portion of the matrix related operations of those algorithms. In some implementations, owner resources 209 may communicate matrix data and opcodes to general purpose array processors 207. General purpose array processors 207 may perform operations indicated by the opcodes on the matrix data and transmit a result to owner resources 209.

For example, a fast Fourier transform owner resource may transmit data and opcodes requesting that one of the general purpose array processors 207 perform one or more matrix operations related to the performance of a fast Fourier. The one of the general purpose array processors 207 may perform the one or more matrix operations, and provide the result to the fast Fourier transform owner resource, which may perform any remaining steps to complete a fast Fourier transform using the result.

In some embodiments, the one of the general purpose array processors 207 may be configured to perform arithmetic operations such as multiplications, additions, and subtractions. Such operations may be performed, for example on individual portions of a matrix at each clock cycle of a general purpose array processor. A combined multiple cycle series of arithmetic operations may be output be the generate purpose array processor and received and processed to generate a result of a matrix operation. For example, a matrix multiplication of matrix $$A: \begin{bmatrix} a11 & a12 \\ a21 & a22 \end{bmatrix}$$

and matrix $$B: \begin{bmatrix} b11 & b12 \\ b21 & b22 \end{bmatrix}$$

may be determined with a series of scalar operations that relate to the matrix multiplication operation. Such a series of operations may determine a resulting matrix $$C: \begin{bmatrix} a11*b11 + a12*b21 & a11*b12 + a12*b22 \\ a21*b11 + a22*b21 & a21*b12 + a22*b22 \end{bmatrix},$$

the four values of which may be determined by four individual scalar calculations. In some embodiments, a general purpose array processor may be used to perform each of the scalar calculations for each value of a matrix resulting from a matrix operation. For example, the values for a11, a12, a21, a22, b11, b12, b21, and b22 may be input into a general purpose array processor in combinations corresponding to each of the values of the matrix C. Opcodes indicating multiply and add, as described below, may be input with each of the combinations of values. The output of each of these four calculations may be received by an owner resource and processed as a resulting matrix C.

In some embodiments, one or more of the general purpose array processors 207 may be shared by one or more of the owner resources. In some example implementations, the number of shared inputs from owner resources may range from three to six. Instead of using dedicated and specialized array processing circuitry for each owner resource, such general purpose array processors may provide standard functionality that may perform matrix operations used the plurality of owner resources.

In some embodiments, using one or more general purpose array processors 207 to perform matrix operations rather than specialized circuitry for each owner resource, may lower the overall hardware cost of system design. Furthermore, in some embodiments, general purpose array processors 207 may be accessed according to a time sharing scheme (e.g., a time-division-multiple-access (TDMA) schedule). Such time sharing may leverage differences between clock speed and data sampling speed (e.g., 200 MHz vs. 20 MHz) that may be experienced in some communication systems. In systems with such large differences, multiple algorithms may be time-multiplexed among general purpose array processors 207 rather than being performed by specialized dedicated hardware without significantly negatively impacting processing speed. Based on a MIMO-OFDM processing timeline, the various owner resources may be give control of one or more general purpose array processors by a simple TDMA arbiter. Such TDMA arbiters are well-known in the art.

In some embodiments, general purpose array processors 207 may be arranged and configured to scale with the design requirements of a system. For example, if a 2×2 MIMO design includes N general purpose array processors, a 4×4 MIMO design may use a substantially similar hardware architecture with 2*N general purpose array processors. The increased number of general purpose array processors may result in a substantially linear increase in processing throughput.

Figure 3:
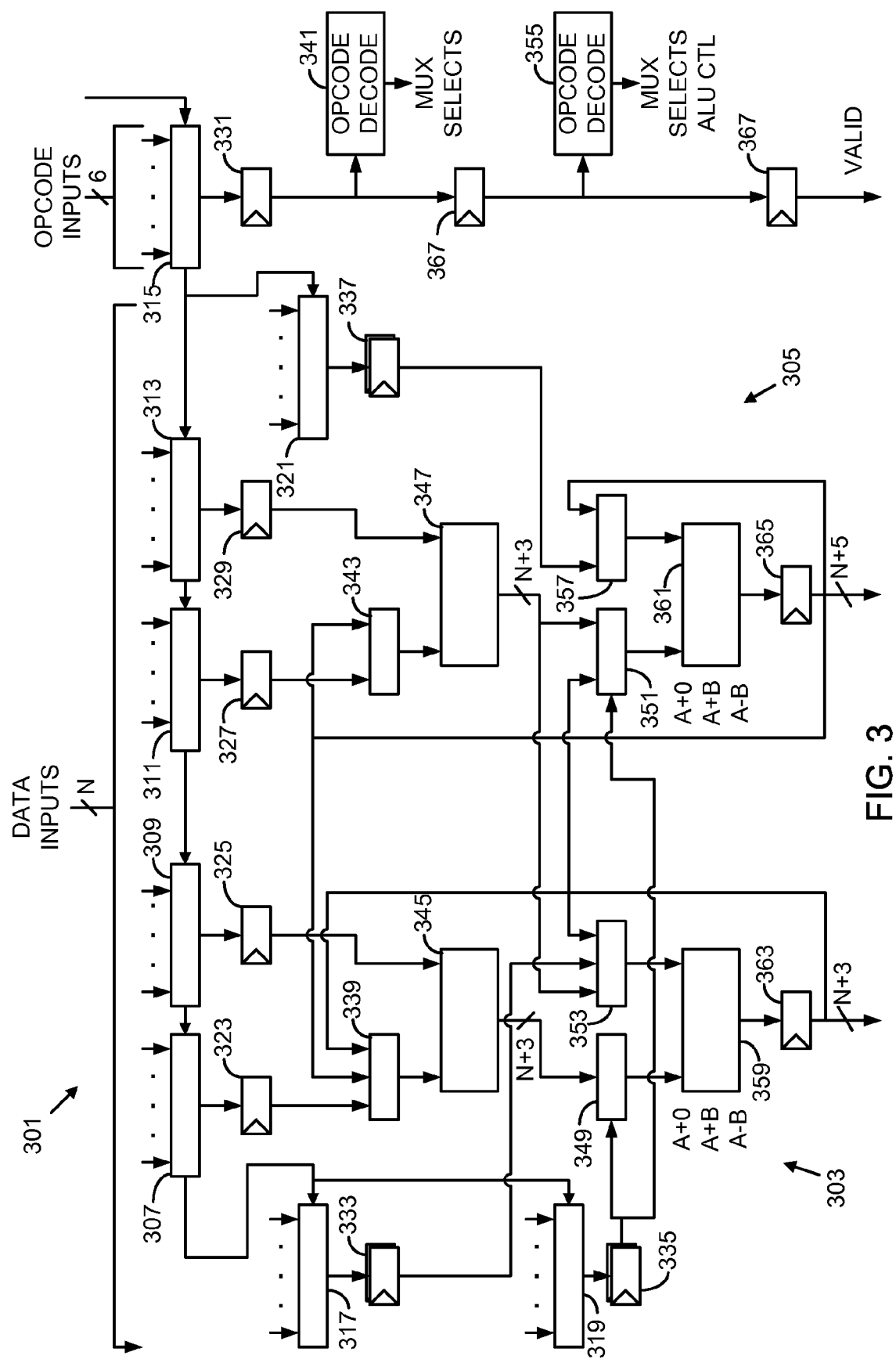
FIG. 3 illustrates a block diagram of an example general purpose array processor in accordance with some embodiments of the instant disclosure.

FIG. 3 illustrates a block diagram of an example general purpose array processor 301 that may, for example, be used as one of the general purpose array processors 207 illustrated in FIG. 2. In some embodiments, general purpose array processor 301 may be configured to perform one of a plurality of possible arithmetic operations on matrix-related data received from an owner resource based on an opcode received from the owner resource.

In some embodiments, the plurality of arithmetic operations may include arithmetic operations that may be useful for a MIMO-OFDM modem in performing matrix operations. In some implementations, the plurality of arithmetic operations may include operations to implement multiple digital signal processing related algorithms, such as fast Fourier transforms, spatial processing, minimum mean square error determination, channel determination, weight computation, and/or phase correction. In one implementation, the arithmetic operations may include multiply, add, subtract and accumulate operations.

In some embodiments, general purpose array processor 301 may be configured to complete at least one multiplication per clock cycle, if desired. In some embodiments, a latency of a single multiplication performed by general purpose array processor 301 may include multiple pipeline stages. In some implementations, the number of pipeline stages may be about three. In some implementations, a following clock cycle may be summed, stored, accumulated and/or otherwise combined with a prior cycle's result, thereby increasing cycle latency.

In some embodiments, general purpose array processor 301 may include two parallel processing paths 303, 305. In some implementations, each processing path 303, 305 may generally perform processing operations related to one set of input data. In some implementations, the two parallel processing paths may allow for data dependency and/or exchange between each other in accordance with an opcode, as is described in more detail below.

In some embodiments, the two parallel processing paths may include a plurality of computational elements arranged so that they may be used for a variety of matrix operations. By arranging the computational elements to be usable for a variety of matrix operations rather than designating specialized elements for separate operations, the computational elements may be reused to perform the various operations, thereby saving cost and space.

The use of two processing paths 303, 305 may allow general purpose array processor 301 to perform parallel processing of real and complex data. In some implementations, a first processing path may perform matrix operations on data related to I components of a quadrature amplitude modulated communication signal and a second processing path may perform matrix operation on data related to Q components of the quadrature amplitude modulated communication signal. In other embodiments, a general purpose array process may process a single I or Q component. In some implementations, a pair of general purpose array processors may then perform both I and Q processing in parallel or a single general purpose array processor may perform I and Q processing in sequence.

In some embodiments, each parallel processing path 303, 305 may include a plurality of multiplexers, a plurality of registers, a multiplier and an arithmetic logic unit. The components may be coupled by a communication network to form the two parallel processing paths 303, 305, as shown in FIG. 3.

Multiplexers 307 and 309 of processing path 303 and multiplexers 311 and 313 of processing path 305 may select input to the respective processing paths from among a plurality of shared owner resources (e.g., received from communication network 211). A corresponding opcode may be selected by opcode multiplexer 315. In some embodiments, corresponding additional inputs may be selected at multiplexers 317, 319, and 321 for use in an operation indicated by the opcode selected by opcode multiplexer 315 in later pipeline stages of general purpose array processor 301, as will be described in more detail below. In some embodiments, the input to multiplexers 307, 309, 311, 313, 315, 317, 319, and 321 may be received as a single communication packet from one of a plurality of owner resources that share general purpose array processor 301.

In some embodiments, the inputs to multiplexers 307, 309, 311, and 313 may be received from registered outputs of an owner resource. In some implementations, because physical placement of the owner resource may produce unpredictable interconnect delays, the outputs of multiplexers 307, 309, 311, 313, and 315 may be registered after selection. In some embodiments, the selected outputs of multiplexers 307, 309, 311, 313, and 315 may be input into registers 323, 325, 327, 329, and 331 respectively, for use in a following pipeline stage of general purpose array processor 301.

Each clock cycle, a new input may be provided to registers 323, 325, 327, 329, and 331 and the old stored values may be output. In some implementations, each register may store a number of bits corresponding to a bit width of input to respective multiplexers.

In some embodiments, the selected output of multiplexers 317, 319, and 321 may be input into registers 333, 335, and 337, respectively. In some implementations, each of the registers 333, 335, and 337 may include multiple registers so that registers 333, 335, and 337 may store multiple input values that correspond to multiple clock cycles. In some implementations, each of registers 333, 335, and 337 may stores two clock cycles of input. At each clock cycle, each register 333, 335, and 337 may receive a new input from a respective multiplexer. Each register may replace one of the stored input values with the new input and output that stored input for use by other components of the general purpose array processor 301, as is described below. In some implementations, an oldest stored input value may be replaced at each clock cycle (e.g., according to a first in first out (FIFO) scheme).

In some embodiments, the output of register 323 may be provided to multiplexer 339. At each clock cycle, the input to multiplexer 339 may include the output from register 323, and the outputs of arithmetic logic unit (ALU) 359 and ALU 361, which will both be described in more detail below. A selection of inputs may be made by a first opcode decoder 341 based on a received opcode, as is described in more detail below.

In some embodiments, the contents of register 327 may be provided to multiplexer 343. At each clock cycle, the input to multiplexer 343 may include the output from register 327, and the output from ALU 361, which will be discussed in more detail below. A selection of inputs may be made by first opcode decoder 341 based on the received opcode, substantially similarly to the selection of input for multiplexer 339.

In some implementations, multiplexers 339 and 343 provide a feedback path to multipliers 345 and 347. If, for example, a subsequent operation being performed by general purpose array processor 301 my references the results of a prior operation, the multiplexers may select the results from that prior operation (e.g., output of one or both of ALUs 359 and 361). Such selection may allow an owner resource to be bypassed in performing the later operation to increase operation speed.

In some embodiments, the output of multiplexer 343 and the contents of register 325 may be provided to multiplier 345, and the output of multiplexer 343 and the contents of register 329 may be provided to multiplier 347. Multipliers 345 and 347 may perform a multiplication on their received respective inputs. In some implementations, multipliers 345 and 347 may include pipelined multipliers. Pipelined multipliers are well known in the art. At each clock cycle, each of multipliers 345 and 347 may output a respective result of a multiplication.

The output of multiplier 345 may be provided to shift element 349. At the pipeline stage at which this output is provided to shift element 349, the corresponding contents of register 335 may be provided to shift element 333. That input may correspond to selected output of multiplexer 319 at the same clock cycle at which the output of multiplexer 307 that was used to generate the output of multiplier 345 was selected at multiplexer 307. In some implementations, as will be described below, bits of the output of multiplier 345 may be shifted in magnitude, and shift element 349 may shift the bits of the result of multiplier 345 in accordance with a value received from register 335 so that the bit magnitudes of the result match with the expected magnitudes of bits accepted by ALU 359. In some implementations, for example, shift element 349 may shift a number of bits equal to the magnitude of a value received from register 335. In some implementations, the values may range from 0 (i.e., no shift) to $Log_2 N$ bits, where N is the number of bits received by shift element 349. Bit shifting is well known in the art. Shift element 349 may then provide the shifted result to ALU 351.

The output of multiplier 347 may be provided to shift-mux element 351 and multiplexer 353. Shift-mux element 351 may shift the bits of the result according to a value received from register 335, similar to shift element 349. Shift-mux element 351 may also receive input from ALU 361, which may also be shifted according to a value received from register 335. In some embodiments, the output of shift-mux element 351 may be chosen by a second opcode decoder 355 according to the received opcode. The output of shift-mux element 351 may then be provided to ALU 361.

In addition to the output of multiplier 347, multiplexer 353 may also receive input that includes the output of ALU 359 and contents of register 333. The input from register 333 may correspond to input selected at multiplexer 317 at the same clock cycle as the input used to generate the results of multiplier 345 was selected at multiplexer 309. The output of multiplexer 353 may be selected by second opcode decoder 355 according to the received opcode. The output of multiplexer 353 may be provided to ALU 359.

In some embodiments, a multiplexer 357 may receive input from ALU 361 and register 337. The input from register 337 may correspond to input selected at multiplexer 321 at the same clock cycle as the input used to generate the result of multiplier 345 was selected at multiplexer 307. The output of multiplexer 357 may be selected by second opcode decoder 355 according to the received opcode. The output of multiplexer 357 may be provided to ALU 361.

In some embodiments, ALU 359 may receive the output of shift element 349 and multiplexer 353. In some embodiments, ALU 361 may receive the output of shift-mux element 351 and multiplexer element 357. ALU 359 and ALU 361 may perform respective desired arithmetic operations on their respective received input. The desired arithmetic operations may be selected by second opcode decoder 355 according to the received opcode. In some implementations, the operations may include one of an addition, an identity addition (e.g., addition to zero), and a subtraction. ALUs are well-known in the art. ALU 359 and ALU 361 may output the results of the desired arithmetic operation to respective registers 363 and 365.

The arithmetic operation performed by ALUs 359 and 361 may be one important characteristic of each clock cycle of general purpose array processor 301. In some implementations, the outputs of multipliers 345 and 347 may be treated as independent results or may be combined together by the ALUs. Furthermore, in some implementations, the outputs of multipliers 345 and 347 may be accumulated in parallel over multiple clock cycles, such as may be useful in performing portions of a matrix multiplication operation. In some implementations, the outputs of multipliers 345 and 347 may also be operated on with external values via multiplexers 353 and 357.

Register 363 may accept the output of ALU 359, and register 363 may provide that output to multiplexers 333 and 353 and shift-mux element 351 for use in data dependent calculations in following clock cycles. Register 363 may also provide output from ALU 359 to an owner resource that requested performance of the operations resulting in the outputs (e.g., though communication network 211).

Register 365 may accept the output of ALU 361, and register 365 may provide the output of ALU 361 to multiplexers 357, 343, and 339 for use in data dependent calculations in following clock cycles. Register 365 may also provide the output to the owner resource that requested performance of the operations resulting in the output (e.g., though communication network 211).

As mentioned above, output selection of various multiplexers and operations of ALUs may be determined by opcodes received by general purpose array processor 301. The opcodes may include a multi-bit sequence that indicates to first and second opcode decoders 341 and 355 which multiplexer inputs to select and which ALU operations to perform. In some implementations, register 367 may store an opcode value after first opcode decoder has decoded the opcode for use in a respective stage of general purpose array processor 301. For a next pipeline stage, register 367 may provide the opcode to opcode decoder 355 for use during the next stage. After that stage, the opcode may be stored in register 369. When a result is output to the owner resource by registers 363 and 365, the corresponding opcode may also be output by register 369 to indicate a valid operation has been completed (e.g., to an owner resource).

In some embodiments, the decoding of opcodes performed by first and second opcode decoders 341 and 355 may be performed in accordance with any opcode decoding method that produces desired inputs to multiplexers and ALUs. Opcode decoding is well-known in the art. In other embodiments, any number of opcode decoders or other mechanisms for controlling ALUs and/or multiplexers may be used.

In one implementation, recognized opcodes may be divided into two portions a portion decoded by first opcode decoder 341 and a portion decoded by second opcode decoder 355. The following table provides example definitions of the first opcode decoder portion:

| First Opcode Decoder Portion | Definition |
| --- | --- |
| 00 | 339 output: 307, 343 output: 311 |
| 01 | 339 output: 363, 343 output: 365 |
| 10 | 339 output: 363, 343 output: 363 |
| 11 | 339 output: 365, 343 output: 365 |

The left hand column indicates the values of two bits of a received opcode and the right hand column indicates outputs selected by multiplexers 339 and 343. For example, if a received opcode includes a first opcode decoder portion of 00, then multiplexer 339 may select the input from multiplexer 307 to be output and multiplexer 343 may select the input from multiplexer 311 to be output.

The following table provides example definitions of the second opcode decoder portion:

| Second Opcode Decoder Portion | Definition |
| --- | --- |
| 0000 | Idle |
| 0001 | Multiply; 307*309, 311*313 |

-continued

| Second Opcode Decoder Portion | Definition |
| --- | --- |
| 0010 | Multiply with external add; 307*309 + 317, 311*313 + 321 |
| 0011 | Multiply with external subtract; 307*309 − 317, 311*313 − 321 |
| 0100 | Multiply and accumulate; $\Sigma$(307*309), $\Sigma$(311*313) |
| 0101 | Multiply with add; 307*309 + 311*313 |
| 0110 | Multiply with subtract; 307*309 − 311*313 |
| 0111 | Multiply with add and external add; 307*309 + 311*313 + 321 |
| 1000 | Multiply with add and external subtract; 307*309 + 311*313 − 321 |
| 1001 | Multiply with subtract and external add; 307*309 − 311*313 + 321 |
| 1010 | Multiply with subtract and external subtract; 307*309 − 311*313 − 321 |
| 1011 | Multiply with add and accumulate; $\Sigma$(307*309 + 311*313) |
| 1100 | Multiply with subtract and accumulate; $\Sigma$(307*309 − 311*313) |

The left hand column indicates the values of four bits of a received opcode and the right hand column indicates one or more results output by one or more of ALUs 359, 361. For example, if a received opcode includes a second opcode decoder portion of 0000, then the ALU may output a default idle value (e.g., all zeros). In some implementations, an idle opcode may be used as a stall mechanism so that during the idle period, the processing paths may still be active from a previous operation.

As another example, if a received opcode includes a second opcode decoder portion of 0001, then the result of a multiply operation without any accumulate may be the output of each ALU 359, 361. This output may correspond to the multiplication of the outputs of multiplexers 307 and 309 for ALU 359 and the multiplication of the outputs of multiplexers 311 and 313 for ALU 361. Such output may result if the operation performed by each of ALUs 359 and 361 correspond to an identity addition (e.g., addition of the input values to zero) and the output of shift-mux element 351 is selected to be the output of multiplier 347. If the second opcode decoder portion instead included 0010, the output may correspond to the multiplication of the outputs of multiplexers 307 and 309 added to the output of multiplexer 317 for ALU 359 and the multiplication of the outputs to multiplexers 311 and 313 added to the output of multiplexer 321 for ALU 361. Such output may result if the operation performed by each ALU corresponds to an addition of respective ALU inputs, the output of multiplexer 353 is selected to be the contents of register 333, the output of multiplexer 357 is selected to be the output of register 337, and the output of shift-mux element 351 is selected to be the output of multiplier 347.

As yet another example, if a received opcode includes a second opcode decoder portion of 0111, then the result of a multiply and add with external addition may be the output of ALU 361. In some implementations, the output of ALU 359 may be an idle output value (e.g., all zeros). Generating such a result may take one additional clock cycle compared to the results described above (i.e., for second opcode decoder portions 0000, 0001, and 0010). In some implementations, such a result may be generated by performing add operations by ALU 359 during a first clock cycle. During the first clock cycle, the output of multiplexer 353 may be selected to include the output of multiplier 347. Also, in some implementations, the output of multiplexer 357 may be selected to be output of register 337, and the operation performed by ALU

361 may be an identity addition. During a second clock cycle, ALU 361 may perform an add operation, and output of shift-mux element 351 may be selected to be input from register 363, and the output of multiplexer 357 may be selected to be the input from register 365 (i.e., the output of the identity addition by ALU 361 from the previous clock cycle).

Accommodating operations that use different numbers of clock cycles may produce complications with overwriting of data as new input conflicts with prior input. In some implementations, a stall mechanism may be included to stall the progression of data through general purpose array processor when an operation that requires extra clock cycles is being performed. Such stalling of data is well known in the art.

In other implementations, the owner resources may control such stalling by inserting a number of idle operations corresponding to the extra clock cycles needed by an operation. Such implementations may not include a separate stall mechanism. Such insertion of idle (e.g., NOP) instruction is well-known in the art. During the idle cycle, the ALUs may be active and may output a result of a previous opcode controlled operation.

In some embodiments, datapaths among elements of general purpose array processor 301 may include desired bit-widths. The desired bit widths may be selected in accordance with desired performance and budget goals. As bit width increases, cost may increase and accuracy of calculations may also increase. The table below indicates one example set of bit-widths that may be used for an embodiment in which an original bit-width of N is input to each of multiplexers 307, 309, 311, and 313. In various implementations, N may include any value. In two example implementations, N may include sixteen and eighteen. Reducing N may increase quantization errors of processed data and reduce area used by general purpose array processor 301.

| Data Path Portions | Number of Bits | Formatting |
| --- | --- | --- |
| 307, 309, 311, 313, 317, 321 | N | All input bits |
| 339, 343 | N | ALU feedback for output of ALU 359 is [N + 2:3] truncate, and for ALU 361 is [N + 4:5] truncate |
| 319 | $\log_2 (N+3)$ | All input bits |
| 345, 347 | N + 3 | [N*2 − 2:N − 4] truncate (drops redundant sign bit, N − 4 lest significant bits) |
| 349, 351 | N + 3 | All input bits |
| 353, 357 | N + 3 | All input bits |
| 359 | N + 3 | All input bits |
| 361 | N + 5 | All input bits |

The left-most column indicates a datapath portion (e.g., output from the identified elements). The center column indicates a bit-width of that portion. The right-most column indicates a formatting of the bits in a datapath portion. For example, output from multiplexers 307, 309, 311, 313, 317, and 321 may include N bits that represent all of the bits received as input to the respective multiplexers. As another example, the output from multipliers 345 and 347 may include N+3 bits. Because multiplication of bits may increase the number of bits to above N+3, the N+3 bits may not represent a complete result of the multiplication. As indicated in the respective formatting column, the bits output may represent the most significant bits (with a sign bit excluded) to the $N-4^{th}$ least significant bit.

It should be recognized that the above description of general purpose array processor 301, opcodes, and bit-widths are given as examples only. In other embodiments of the instant disclosure, any desired arrangement of elements may be combined to generate a general purpose array processing that operates using any desired bit widths to perform any desired operations based on any set of opcodes.

Figure 4:
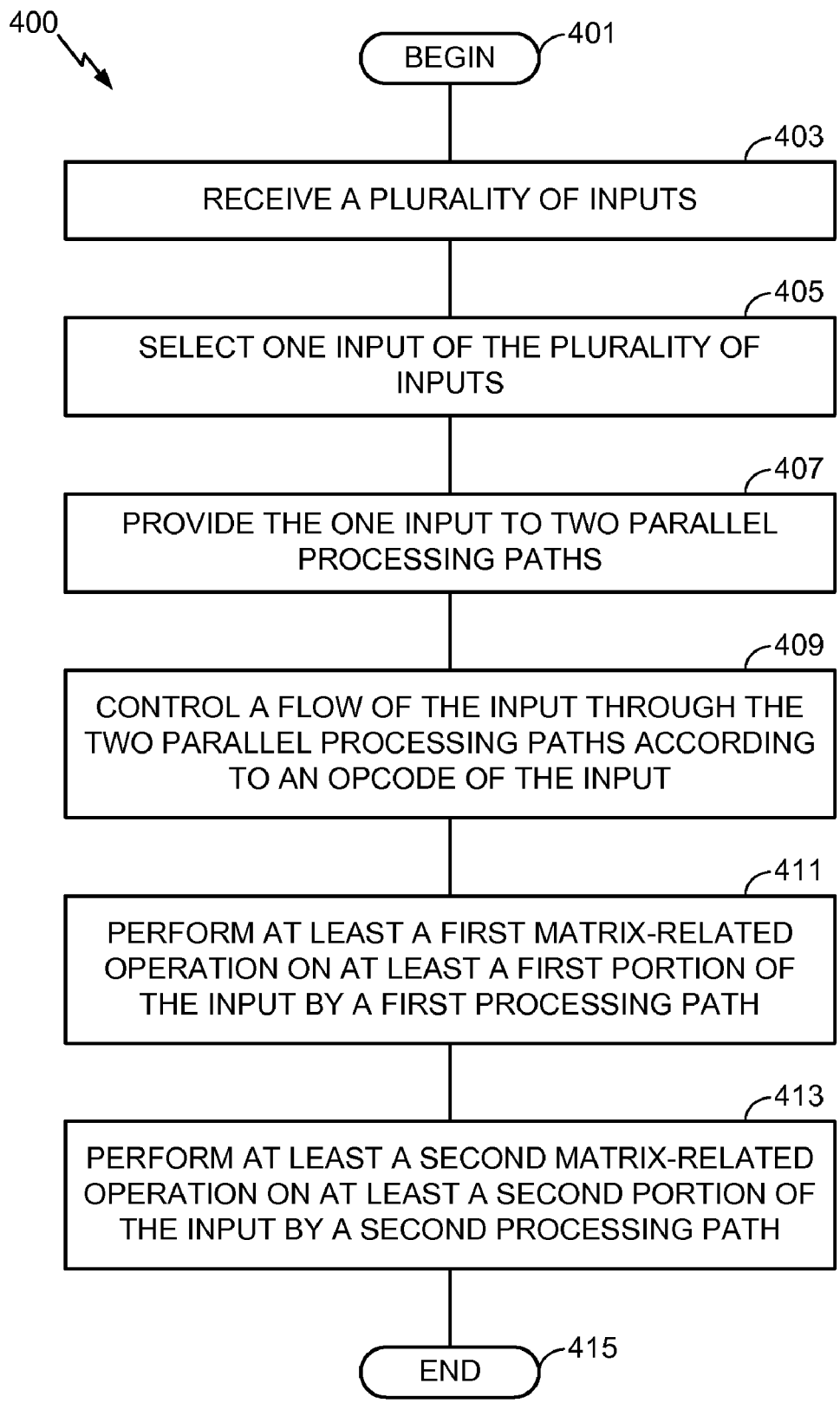
FIG. 4 illustrates an example process that may be used for performing general purpose array processing according to some embodiments of the instant disclosure.

Having described an example general purpose array processor, a method of performing general purpose array processing may be described. FIG. 4 illustrates an example process 400 that begins at block 401 and may be used for performing general purpose array processing according to some embodiments of the instant disclosure.

As indicated at block 403, process 400 may include receiving input from one or more owner resources. As described above, the input may be received over a communication from one or more owner resources that share a single general purpose array processor.

As indicated at block 405, process 400 may include selecting an input for processing. Selecting the input may include selecting one of the inputs received at block 403. The selected input may include operation data (e.g., bit sequences on which arithmetic operations may be performed) and an opcode. Selecting the input may include selecting the input based on a time division multiple access scheme. Such a scheme may select inputs based on the order in which data is processed by a plurality of owner resources sharing a general purpose array processor. In some embodiments, each owner resource may be allocated a sufficient time so that data may be processed by/for the respective owner resource during the time and used by a next one of the owner resources or another processing or transmission element.

As indicated at block 407, process 400 may include providing at least portions of the input to two parallel processing paths. Each of the processing paths, as described above, may include a plurality of computational components configured and arranged to perform one or more desired operations on the operation data according to the opcode.

As indicated at block 409, process 400 may include controlling a flow of the input through the two processing paths based on the opcode. The flow of input may include the opcode itself, as well as the operation data and results of performing operations on the operation data. The flow of data may be controlled so that a particular desired matrix-related operation may be performed using the data.

In some implementations, directing the flow of the data may include directing the flow of the data so that an output of one of the processing paths is used as an input of the other processing path. For example, an input of one pipelined processing path stage may include an output of a prior pipeline processing path stage of a different processing path. In some embodiments, directing the flow of the data may include selecting inputs at one or more processing stages according to the opcodes.

As indicated at block 411, process 400 may include performing a first matrix-related operation in the first parallel processing path based on the opcode. The matrix related-operation, may include an arithmetic operation selected based on the opcode.

As indicated at block 413, process 400 may include performing a second matrix-related operation in the second parallel processing path based on the opcode. The matrix related-operation may include an arithmetic operation selected based on the opcode.

In some implementations, the results of the first and second matrix operations may be output to the owner resource and/or used in subsequent processing. Process 400 may end at block 415.

The techniques described herein may be implemented in MIMO wireless communications systems, as well as in any communication system, wireless or otherwise, in which one or more pilot tones are employed. The techniques described herein may be implemented in a variety of ways, including hardware implementation, software implementation, or a combination thereof. For a hardware implementation, the processing units used to process data for transmission at a transmitting station and/or for receipt at a receiving station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. In embodiments in which the transmit and receive stations include multiple processors, the processors at each station may share hardware units.

For a software implementation, the data transmission and reception techniques may be implemented with software modules (e.g., procedures, functions, and so on) that perform the functions described herein. The software codes may be stored in a memory unit and executed by a processor. The memory unit may be implemented within the processor or external to the processor.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An array processor apparatus comprising:
   at least one opcode control element configured to generate a first opcode portion and a second opcode portion in accordance with a received opcode to obtain elements of a matrix to transmit a result to an owner resource;
   a plurality of multiplexers configured to selectively output data to a plurality of multipliers in response to the first opcode portion, the plurality of multipliers configured to operate on the data received from the plurality of multiplexers;
   a plurality of arithmetic logic units (ALUs) configured to operate on data received from the plurality of multipliers, the data being received in response to the second opcode portion,
      wherein the plurality of multiplexers, the plurality of multipliers and the plurality of ALUs form two parallel processing paths, each parallel processing path being configured to perform a set of matrix operations according to the opcode received by the at least one opcode control element, and
      wherein the second opcode portion includes a multi-bit sequence that controls whether the plurality of ALUs output a value corresponding to an idle operation or a value corresponding to one of a plurality of different multiply operations; and
   a register that outputs at least a third opcode portion of the received opcode to indicate whether or not the value output by the plurality of ALUs corresponds to a completed valid operation.

2. The array processor apparatus of claim 1, wherein the third opcode portion comprises the entire received opcode.

3. The apparatus of claim 1, wherein the plurality of different multiply operations comprise at least one of a multiply operation with external addition, a multiply operation with external subtraction, a multiply operation with accumulation, a multiply operation with summation of results, a multiply operation with subtraction of results, a multiply operation with summation of results and external addition, a multiply with summation of results and external subtract, a multiply operation with subtraction of results and external addition, a multiply operation with subtraction of results and external addition, a multiply operation with summation of results and accumulation, and a multiply operation with subtraction of results and accumulation.

4. The apparatus of claim 3, wherein the two parallel processing paths are configured to perform each of the multiply operation, the multiply operation with external addition, the multiply operation with external subtraction, the multiply operation with accumulation, the multiply operation with summation of results, the multiply operation with subtraction of results, the multiply operation with summation of results and external addition, the multiply with summation of results and external subtract, the multiply operation with subtraction of results and external addition, the multiply operation with subtraction of results and external addition, the multiply operation with summation of results and accumulation, and the multiply operation with subtraction of results and accumulation.

5. The apparatus of claim 1, wherein a first parallel processing path of the two parallel processing paths includes a first pipelined parallel processing path, and a second parallel processing path of the two parallel processing paths includes a second pipelined parallel processing path.

6. The apparatus of claim 5, wherein input to a first pipeline stage of the first parallel processing path includes output of a second pipeline stage of the second parallel processing path.

7. The apparatus of claim 6, wherein the at least one opcode control element is configured to select the input to the first pipeline stage and the input to the second pipeline stage based on the received opcode.

8. The apparatus of claim 6, wherein input to a third pipeline stage of the second parallel processing path includes output of a fourth pipeline stage of the first parallel processing path.

9. The apparatus of claim 6, wherein the first pipeline stage includes a multiplication stage and the second pipeline stage includes an arithmetic-logic stage.

10. The apparatus of claim 6, wherein the first pipeline stage includes an arithmetic-logic stage and the second pipeline stage includes a multiplication stage.

11. The apparatus of claim 6, wherein the first pipeline stage includes a first arithmetic-logic stage and the second pipeline stage includes a second arithmetic-logic stage.

12. The array processor apparatus of claim 1, wherein a first parallel processing path of the two parallel processing paths includes a processing path for processing real matrix values, and a second parallel processing path of the two parallel processing paths includes a processing path for processing imaginary matrix values.

13. The array processor apparatus of claim 1, wherein the plurality of multipliers includes two multipliers.

14. The array processor apparatus of claim 13, wherein a first parallel processing path of the two parallel processing paths includes a first multiplier of the two multipliers, and a second parallel processing path of the two parallel processing paths includes a second multiplier of the two multipliers.

15. The array processor apparatus of claim 1, wherein the plurality of ALUs includes two ALUs.

16. The array processor apparatus of claim 15, wherein a first parallel processing path of the two parallel processing paths includes a first ALU of the two ALUs, and a second parallel processing path of the two parallel processing paths includes a second ALU of the two ALUs.

17. The array processor apparatus of claim 16, wherein a first input of the first ALU includes an output of a first multiplier of the plurality of multipliers, a second input of the first ALU includes an output of a second multiplier of the plurality of multipliers, and an input of the second ALU includes an output of the second multiplier.

18. The array processor apparatus of claim 1, wherein the at least one opcode control element is configured to select an arithmetic operation performed by at least one of the plurality of ALUs based on the opcode.

19. The array processor apparatus of claim 1, wherein the at least one opcode control element is configured to control a flow of data through the plurality of multiplexers based on the received opcode.

20. The array processor apparatus of claim 19, wherein controlling the flow of data includes controlling data dependencies between the two parallel processing paths and input of external data.

21. A MIMO OFDM receiver apparatus comprising at least one of the array processor apparatus of claim 1.

22. The MIMO OFDM receiver apparatus of claim 21, comprising a plurality of array processor apparatus of claim 1.

23. A MIMO OFDM transmitter apparatus comprising at least one of the array processor apparatus of claim 1.

24. The MIMO OFDM transmitter apparatus of claim 23, comprising a plurality of array processor apparatus of claim 1.

25. An array processor apparatus comprising:
means for generating a first opcode portion and a second opcode portion in accordance with a received opcode to obtain elements of a matrix to transmit a result to an owner resource;
means for selectively outputting data to a plurality of multipliers in response to the first opcode portion, the plurality of multipliers configured to operate on the data received from the means for selectively outputting data;
means for operating on data received from the plurality of multipliers, the data being received by a plurality of ALUs in response to the second opcode portion,
wherein the means for selectively outputting data, the plurality of multipliers, and the means for operating on data form two parallel processing paths, each parallel processing path being configured to perform a set of matrix operations according to the opcode received by the means for generating the first opcode portion and the second opcode portion,
wherein the second opcode portion includes a multi-bit sequence that controls whether the means for operating on data output a value corresponding to an idle operation or a value corresponding to one of a plurality of different multiply operations, and
means for outputting at least a third opcode portion of the received opcode to indicate whether or not the value output by the plurality of ALUs corresponds to a completed valid operation.

26. The array processor apparatus of claim 25, wherein the third opcode portion comprises the entire received opcode.

27. The apparatus of claim 25 wherein the plurality of different multiply operations includes at least one of a multiply operation, a multiply operation with external addition, a multiply operation with external subtraction, a multiply operation with accumulation, a multiply operation with summation of results, a multiply operation with subtraction of results, a multiply operation with summation of results and external addition, a multiply with summation of results and external subtract, a multiply operation with subtraction of results and external addition, a multiply operation with subtraction of results and external addition, a multiply operation with summation of results and accumulation, and a multiply operation with subtraction of results and accumulation.

28. The apparatus of claim 27, wherein the two parallel processing paths are configured to perform each of the multiply operation, the multiply operation with external addition, the multiply operation with external subtraction, the multiply operation with accumulation, the multiply operation with summation of results, the multiply operation with subtraction of results, the multiply operation with summation of results and external addition, the multiply with summation of results and external subtract, the multiply operation with subtraction of results and external addition, the multiply operation with subtraction of results and external addition, the multiply operation with summation of results and accumulation, and the multiply operation with subtraction of results and accumulation.

29. The apparatus of claim 25, further comprising:
a means for controlling dependency of data between the two parallel processing paths; and
a means for controlling input of external data to the two parallel processing paths.

30. The apparatus of claim 25, wherein the two parallel processing paths comprise:

a means for processing real matrix values; and a means for processing imaginary matrix values in parallel with the real matrix values.

31. The apparatus of claim 25, further comprising means for selecting an output of a plurality of multiplexers.

32. The apparatus of claim 25, further comprising means for selecting an arithmetic operation performed by at least one ALU.

33. A method of performing matrix operations, the method comprising:

generating, using at least one opcode control element, a first opcode portion and a second opcode portion in accordance with a received opcode to obtain elements of a matrix to transmit a result to an owner resource;

selectively outputting data to a plurality of multipliers in response to the first opcode portion using a plurality of multiplexers, the plurality of multipliers configured to operate on the data received from the plurality of multiplexers;

operating on data received from the plurality of multipliers using a plurality of arithmetic logic units (ALUs), the data being received in response to the second opcode portion, wherein the plurality of multiplexers, the plurality of multipliers, and the plurality of ALUs form two parallel processing paths, each parallel processing path being configured to perform a set of matrix operations according to the opcode received by the at least one opcode control element, and wherein the second opcode portion includes a multi-bit sequence that controls whether the plurality of ALUs output a value corresponding to an idle operation or a value corresponding to one of a plurality of different multiply operations, and outputting at least a third opcode portion of the received opcode to indicate whether or not the value outputted by the plurality of ALUs corresponds to a completed valid operation.

34. The method of claim 33, wherein the third opcode portion comprises the entire received opcode.

35. The method of claim 33, wherein the plurality of different multiply operations includes at least one of a multiply operation, a multiply operation with external addition, a multiply operation with external subtraction, a multiply operation with accumulation, a multiply operation with summation of results, a multiply operation with a subtraction of results, a multiply operation with summation of results and external addition, a multiply with summation of results and external subtract, a multiply operation with subtraction of results and external addition, a multiply operation with subtraction of results and external addition, a multiply operation with summation of results and accumulation, and a multiply operation with subtraction of results and accumulation.

36. The method of claim 33, further comprising directing an output of a first pipeline stage of a first parallel processing path of the two parallel processing paths to an input of a second pipeline stage of a second parallel processing path of the two parallel processing paths.

37. The method of claim 36, further comprising selecting an input to the first pipeline stage of the first parallel processing path and the second pipeline stage of the second parallel processing path based on the received opcode.

38. The method of claim 36, wherein the first pipeline stage includes a multiplication stage and the second pipeline stage includes an arithmetic-logic stage.

39. The method of claim 36, wherein the first pipeline stage includes an arithmetic-logic stage and the second pipeline stage includes a multiplication stage.

40. The method of claim 36, wherein the first pipeline stage includes a first arithmetic-logic stage and the second pipeline stage includes a second arithmetic-logic stage.

41. The method of claim 36, further comprising directing an output of a third pipeline stage of the second parallel processing path to an input of a fourth pipeline stage of the first parallel processing path.

42. The method of claim 33, wherein a first parallel processing path of the two parallel processing paths includes a processing path for processing real matrix values; and a second parallel processing path of the two parallel processing paths includes a processing path for processing imaginary matrix values.

43. The method of claim 33, further comprising controlling a flow of data through the plurality of multiplexers based on the received opcode.

44. The method of claim 43, further comprising controlling data dependencies between the two parallel processing paths and controlling input of external data.

45. The method of claim 43, further comprising directing an output of a first multiplier of a first parallel processing path of the two parallel processing paths and directing the output of a second multiplier of a second parallel processing path of the two parallel processing paths.

46. The method of claim 45, wherein directing the output of the first multiplier comprises directing the output of the first multiplier to a first input of a first ALU of the first parallel processing path and directing the output of the second multiplier comprises directing the output of the second multiplier to a second input of the first ALU and an input of a second ALU of the second parallel processing path.

47. The method of claim 33, further comprising:

selecting a first operation for a first ALU based on the received opcode; and selecting a second operation for a second ALU based on the received opcode.

48. A machine-readable medium including instructions stored thereon, the instructions executable by one or more processors for:

generating a first opcode portion and a second opcode portion in accordance with a received opcode to obtain elements of a matrix to transmit a result to an owner resource;

selectively outputting data to a plurality of multipliers in response to the first opcode portion using a plurality of multiplexers, the plurality of multipliers configured to operate on the data received from the plurality of multiplexers;

operating on data received from the plurality of multipliers using a plurality of arithmetic logic units (ALUs), the data being received in response to the second opcode portion, wherein the plurality of multiplexers, the plurality of multipliers, and the plurality of ALUs form two parallel processing paths, each parallel processing path being configured to perform a set of matrix operations according to the received opcode, wherein the second opcode portion includes a multi-bit sequence that controls whether the plurality of ALUs output a value corresponding to an idle operation or a value corresponding to one of a plurality of different multiply operations, and outputting at least a third opcode portion of the received opcode to indicate whether or not the value outputted by the plurality of ALUs corresponds to a completed valid operation.

49. The machine readable medium of claim 48, wherein the plurality of different multiply operations comprise at least one of a multiply operation with external addition, a multiply operation with external subtraction, a multiply operation with accumulation, a multiply operation with summation of results, a multiply operation with subtraction of results, a multiply operation with summation of results and external addition, a multiply with summation of results and external subtract, a multiply operation with subtraction of results and external addition, a multiply operation with subtraction of results and external addition, a multiply operation with summation of results and accumulation, and a multiply operation with subtraction of results and accumulation.

50. The machine-readable medium of claim 48, wherein the third opcode portion comprises the entire received opcode.

* * * * *